Figure 1:
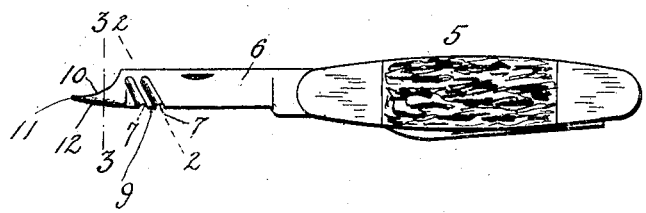

R. WILD.
MANICURE IMPLEMENT.
APPLICATION FILED NOV. 21, 1908.

920,409.

Patented May 4, 1909.

Witnesses
Wm Pyne
W. A. Simonds.

Inventor
Rudolf Wild
By Max A. Schmidt
Attorney

UNITED STATES PATENT OFFICE.

RUDOLF WILD, OF LOS ANGELES, CALIFORNIA.

MANICURE IMPLEMENT.

No. 920,409. Specification of Letters Patent. Patented May 4, 1909.

Application filed November 21, 1908. Serial No. 463,921.

*To all whom it may concern:*

Be it known that I, RUDOLF WILD, a subject of the Emperor of Germany, residing at Los Angeles, in the county of Los Angeles and State of California, have invented certain new and useful Improvements in Manicure Implements, of which the following is a specification.

This invention relates to manicure implements of that kind characterized by a blade provided with a sharp edge for cutting and trimming the nails.

The object of the present invention is to provide the implement with a novel form of cutting edge which enables the nails to be cut and trimmed without danger of cutting into the flesh, as well as to enable the implement to be held in either hand when in use.

The invention also has for its object to provide the blade with means for cleaning the nails, together with a guide therefor to facilitate the operation.

With these objects in view, the invention consists in a novel construction and arrangement of parts to be hereinafter described and claimed, reference being had to the drawing hereto annexed, in which—

Figure 2:
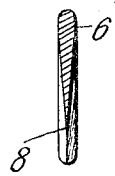
Figure 3:

Figure 1 is an elevation of the implement. Fig. 2 is an enlarged section on the line 2—2 of Fig. 1. Fig. 3 is a similar view on the line 3—3 of Fig. 1.

The invention is shown herein as one of the blades of an ordinary pocket knife, the handle of which is indicated at 5 in the drawing, and said blade by the reference numeral 6. It is however to be understood, that the blade referred to may be mounted on some different kind of handle or support.

In one of the edges of the blade 6, near its outer end, I make a pair of notches 7, the walls of which are semicircular in form, and beveled on both sides, as clearly shown in Fig. 2, to form cutting edges 8 of the nail-cutter portion of the implement. By beveling the notches on both sides, it will be seen that the implement may be held in either hand when in use, whereas, with a single bevel, it would not cut as readily when held in one hand as when held in the other hand, and the nail will also be cut squarely and smooth, and without leaving a sharp or ragged edge.

The notches are located closely together, and the short portion 9 of the edge therebetween, serves as a gage for the cutting edges. When the cutting edge of the forward notch is used, the portion 9 lies beneath the protruding end of the nail to be cut off, and thereby prevents said edge from entering too deeply into the nail, and thus cutting the flesh under the same. By providing two cutting edges, the implement may also be used for cutting the toe-nails, the cutting edge of the rear notch being used for this purpose, in order to obtain the action of the gage 9.

The back edge of the blade 6 terminates in a concave portion 10 which meets the edge of the blade in which the notches 7 are made, to form a point 11 which may be used to clean the nail, or remove accumulations thereunder, the tip of the finger or toe being received in the concave edge portion 10, which is rounded and smooth in order not to cut into the tip.

That portion of the edge of the blade in which the notches 7 are made, between the forward notch and the point 11, is convex and sharpened to form a cutting edge 12, which may be used for scraping or trimming the nails.

It will be seen from the foregoing that I have provided a manicure implement which is simple in structure so that it can be cheaply manufactured, and by providing the particular form and arrangement of cutting edges herein described, the implement is rendered safe, and can be easily operated, and it effectually serves the purpose for which it is designed. The cutting edges, by reason of their semicircular form, do not become easily dulled, and they remain sharp throughout a long period of use of the implement. I have shown the face of the blade plain, but, if desired, it may be formed with a file surface.

The notches extend at an acute angle with respect to the longitudinal axis of the blade, which brings the cutting edges into a position to be used with greater facility and comfort. The back edge of the blade, up to the part 10, and the opposite edge, up to the notches, are rounded off as shown in Fig. 2 of the drawing, in order that they may be grasped without danger of the user being cut thereby.

I claim:—

1. A manicure implement comprising a blade having in one of its edges a pair of notches located in close proximity to each other, the walls of the notches being beveled to form cutting edges, and the body of the blade between the notches forming a gage to limit the penetration of the cutting edges.

2. A manicure implement comprising an elongated blade having adjacent to its outer end a pair of notches located in close proximity to each other, the walls of the notches being beveled to form cutting edges, and the body of the blade between the notches forming a gage to limit the penetration of the cutting edges, and said notched edge of the blade being blunt from its butt-end up to the notches.

In testimony whereof I affix my signature in presence of two witnesses.

RUDOLF WILD.

Witnesses:
HOWARD WILD,
WM. ROTHERMEL.